W. S. BRALLEY.
NEUTRALIZING INDUCTION FROM ALTERNATING CURRENT RAILWAYS.
APPLICATION FILED AUG. 7, 1907.
1,011,020.
Patented Dec. 5, 1911.
2 SHEETS—SHEET 1.
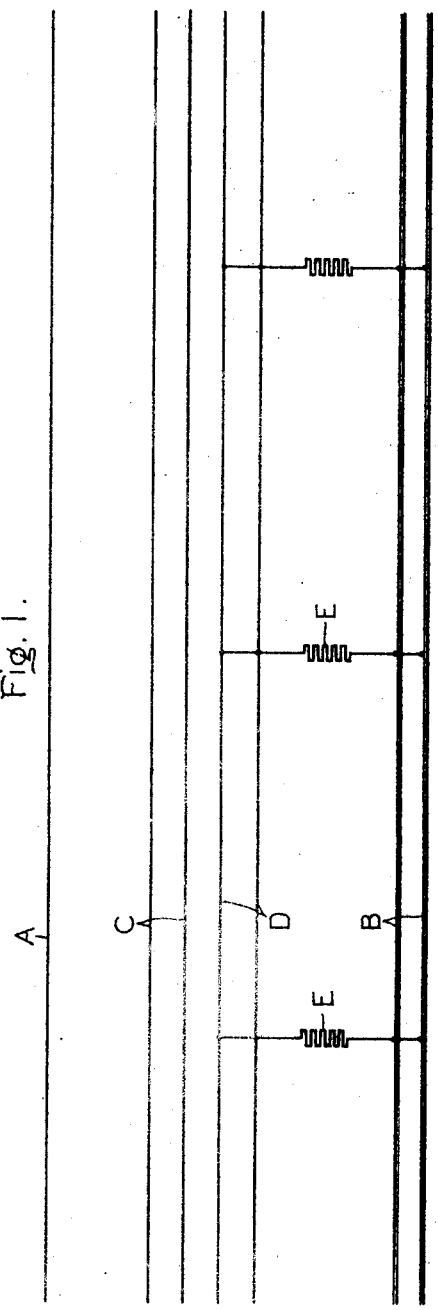
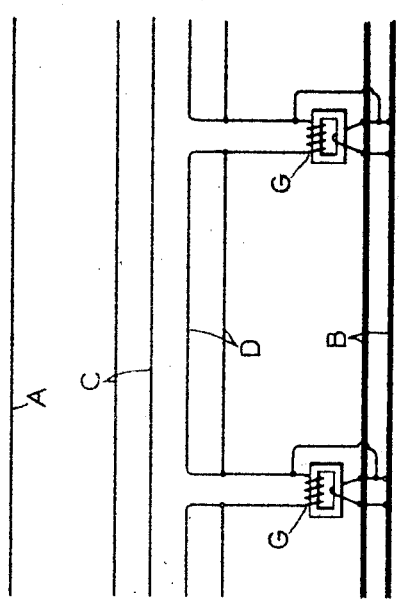
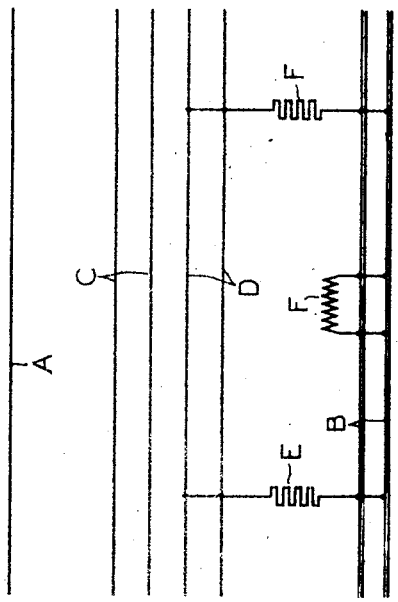
Witnesses:
George H. Tilden
J. Ellis Glenn
Inventor:
Walter S. Bralley,
by Albert G. Davis
Att'y W. S. BRALLEY.
NEUTRALIZING INDUCTION FROM ALTERNATING CURRENT RAILWAYS.
APPLICATION FILED AUG. 7, 1907.
1,011,020.
Patented Dec. 5, 1911.
2 SHEETS—SHEET 2.
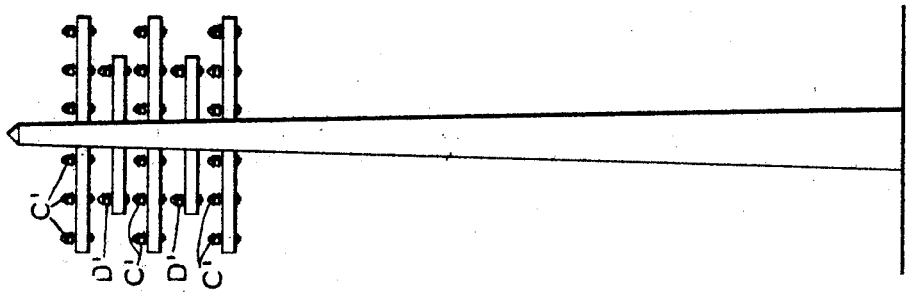
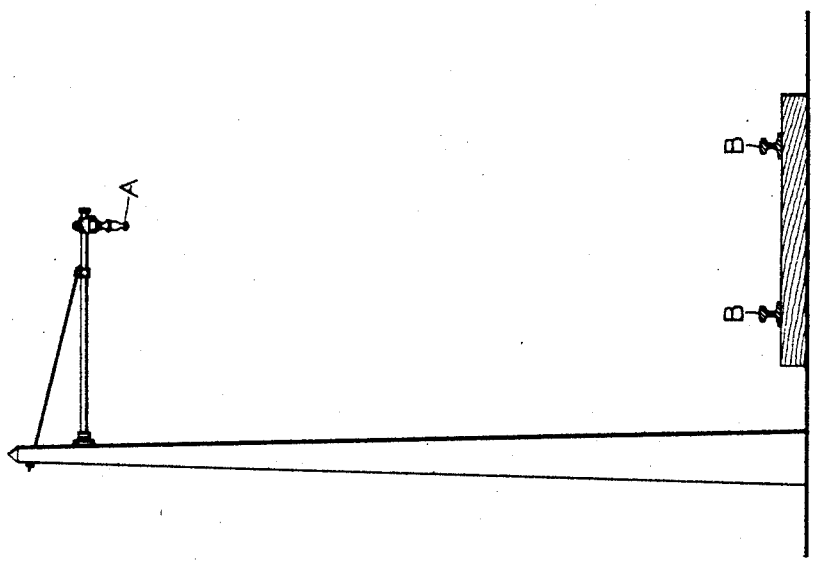
Fig. 4.
Witnesses:
George H. Tilden
J. Ellis Glen
Inventor:
Walter S. Bralley,
by Albert H. Davis
Att'y.

UNITED STATES PATENT OFFICE.

WALTER S. BRALLEY, OF SCHENECTADY, NEW YORK, ASSIGNOR TO GENERAL ELECTRIC COMPANY, A CORPORATION OF NEW YORK.

NEUTRALIZING INDUCTION FROM ALTERNATING-CURRENT RAILWAYS.

1,011,020.

Specification of Letters Patent.

Patented Dec. 5, 1911.

Application filed August 7, 1907. Serial No. 387,431.

*To all whom it may concern:*

Be it known that I, WALTER S. BRALLEY, a citizen of the United States, residing at Schenectady, county of Schenectady, State of New York, have invented certain new and useful Improvements in Neutralizing Induction from Alternating-Current Railways, of which the following is a specification.

My invention relates to the protection of conductors against induction from alternating-current railways employing the rails as return conductor for the power-current and consists in placing near to the conductor to be protected a neutralizing conductor connected in shunt to the rails. If the proper portion of the power-current flows through this neutralizing conductor, it will neutralize the electromagnetic inductive effects of the currents in trolley and rails. Furthermore, since the neutralizing wire is connected to the rails,—or, in other words, grounded—it will serve partly to neutralize electrostatic induction, since, by bringing the ground near to the conductor to be protected, it brings the electrostatic induced voltage on that conductor near to earth potential.

My invention comprises certain features, which will best be understood by reference to the following specification and accompanying drawings, in which—

Figure 1 shows diagrammatically an alternating-current railway provided with neutralizing conductors arranged in accordance with my invention; Fig. 2 shows a modification of the same; Fig. 3 shows a further modification; and Fig. 4 shows a suitable method of locating the neutralizing conductors effectively.

In Fig. 1, A represents the trolley-wire, B the rails, and C the conductors to be protected. D represents the neutralizing conductors, which are connected in shunt to the rails B. Resistances E may be inserted in the connections between the conductors D and the rails, or in the conductors themselves, in order to produce the proper division of current between the neutralizing conductor and the rails, in case the division which would be produced by their relative impedances should not give the proper current in the neutralizing conductors. It will be seen from Fig. 1 that if a proper portion of the power-current is returned through the neutralizing conductors D, the electromagnetic induction on the conductors C of the power-current in the trolley-wire and rails D will be neutralized. Furthermore, since the conductors D are connected to the rails, and consequently are grounded, the induced electrostatic voltage of conductors C is brought near to earth potential.

Fig. 2 shows a modification, in which a reactive winding F is inserted in series with the rails in order to increase the proportion of current through the neutralizing conductors D.

Fig. 3 shows an arrangement in which series transformers are employed for insuring the proper division of current between neutralizing conductors and rails. Each transformer G has one winding in series with the rails and the other in series with the neutralizing conductors.

In Fig. 4, a suitable location for the neutralizing conductors is shown. In this figure C' C' represent the insulators on which are carried the telegraph or telephone wires adjacent to the railway which are to be protected from induction disturbances. D' D' represent insulators carrying the neutralizing conductors. In order that these may be effective with respect to all the telephone or telegraph wires, these insulators are so placed that they are as nearly equidistant as possible from the several wires to be protected.

What I claim as new and desire to secure by Letters Patent of the United States, is,—

1. In combination with an alternating-current railway employing the rails as return conductor for the power-current, as a means for protecting adjacent conductors from induction, a neutralizing conductor placed near the conductor to be protected and connected in shunt to the rails.

2. In combination with an alternating-current railway employing the rails as return conductor for the power-current, as a means for protecting adjacent conductors from induction, a neutralizing conductor placed near the conductor to be protected and connected in shunt to the rails, and means for producing a division of current between the rails and said neutralizing conductor differing from that which would be produced by their relative impedances.

3. In combination with an alternating-current railway employing the rails as return conductor for the power-current, as a means for protecting adjacent conductors from induction, a neutralizing conductor placed near the conductor to be protected and connected in shunt to the rails, and reactive windings controlling the division of current between the rails and said neutralizing conductor.

4. In combination with an alternating-current railway employing the rails as return conductor for the power-current, as a means for protecting adjacent conductors from induction, a neutralizing conductor placed near the conductor to be protected and connected in shunt to the rails, and a transformer having its windings in series with the rails and with said neutralizing conductor respectively.

5. Means to neutralize the inducing effect of a power wire on neighboring lines of transmission, said means comprising a conductor placed in the neighborhood of the lines of transmission and connected in shunt with the return of said power wire.

6. In combination with a series of lines useful for transmitting intelligence, a power wire positioned in the inducing region of said lines, a return for said power wire, a shunt circuit for said return, said shunt circuit positioned in the neighborhood of said lines of transmission.

7. Means to neutralize the inducing effect of a power wire on neighboring lines of transmission, said means embracing a conductor positioned near said lines of transmission, said conductor forming a shunt around the return for said power wire, and means in said shunt to produce the proper division of current between the conductor and said return.

8. In a system of power transmission wherein the rails of travel are the return, means to neutralize the inducing effect of said power wire on neighboring lines of transmission, said means comprising a conductor positioned near said lines of transmission, said conductor shunting part of said rails of travel.

In witness whereof, I have hereunto set my hand this 3rd day of August, 1907.

WALTER S. BRALLEY.

Witnesses:
BENJAMIN B. HULL,
HELEN ORFORD.